Nov. 13, 1934.  E. A. GOOD  1,980,517
SEED CLEANER
Original Filed March 11, 1932  2 Sheets-Sheet 1

Inventor
*Ezra A. Good*

By *Clarence A. O'Brien*
Attorney

Nov. 13, 1934.   E. A. GOOD   1,980,517
SEED CLEANER
Original Filed March 11, 1932   2 Sheets-Sheet 2

Inventor
Ezra A. Good
By Clarence A. O'Brien
Attorney

Patented Nov. 13, 1934

1,980,517

UNITED STATES PATENT OFFICE 1,980,517

SEED CLEANER

Ezra A. Good, Clarksville, Mich.

Application March 11, 1932, Serial No. 598,267
Renewed May 7, 1934

1 Claim. (Cl. 209—113)

This invention relates to a seed cleaner which is mainly designed for cleaning clover seed, the general object of the invention being to provide a pair of diagonally arranged fabric coated rollers which engage each other, with means for rotating the rollers in opposite directions and means for feeding the seeds to be cleaned into the upper part of the space formed by the rollers, so that the seeds will travel down the said space and the rollers will remove dirt, foreign matter and other seeds therefrom.

Another object of the invention is to provide brush means for removing this foreign matter and other seeds from the rollers.

A further object of the invention is to form the rollers of rubber so that the wear on the covering will be but slight.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Fig. 3 is a transverse sectional view.

Figure 1:
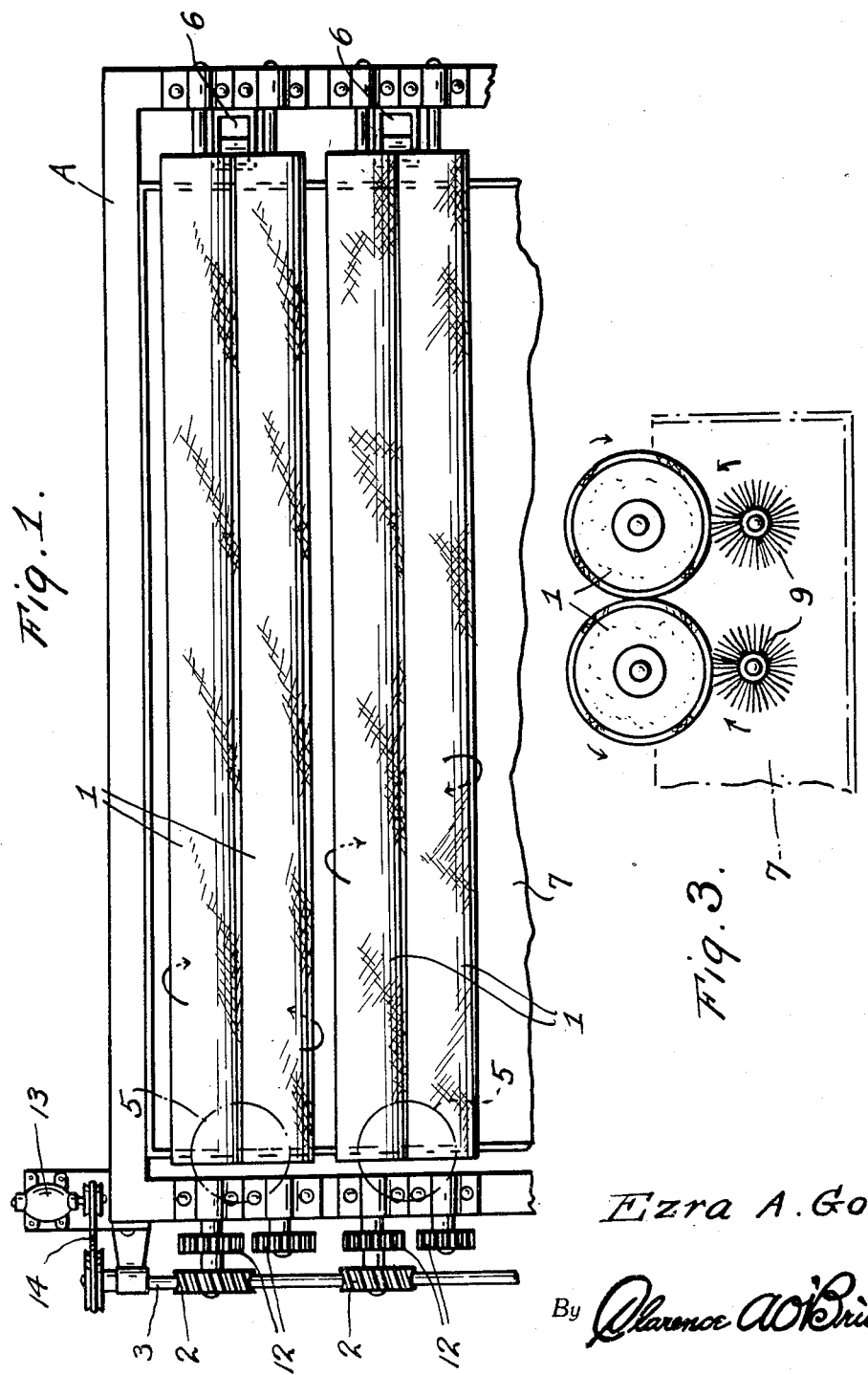
Figure 1 is a plan view of a part of a machine constructed in accordance with this invention.

In these drawings, the letter A indicates a supporting frame having one end higher than the other and the numeral 1 indicates pairs of rollers having their trunnions journalled in the high and low ends of the same, so that the rollers are supported in an inclined position sloping downwardly from the high end of the machine. The rollers of each pair contact each other, so as to form a space or gutter in which the seeds to be cleaned travel during the rotary movement of the rollers.

Each roller has its major portion formed of rubber as shown and a cover 1' of canvas or the like is placed over the rubber. The upper trunnion of one roller of each pair is extended and has a worm gear 2 thereon and a transverse shaft 3 is supported at the high end of the frame and has worms 4 thereon for engaging the gears 2. Thus one roller of each pair is positively rotated, and as this roller contacts the other roller of the pair, such other roller is also rotated but in an opposite direction from the first roller as shown by the arrows in the drawings.

A funnel or hopper 5 is provided for directing the seeds to be cleaned into the space or trough formed by each pair of rollers, and the cleaned seeds dropping from this space or trough will fall into a chute 6 at the lower end of the frame into a suitable receptacle placed under the chute. A pan 7 having its bottom sloping downwardly toward the discharge end of the machine is placed under the rollers to receive the waste material and this pan has a discharge chute 8 at its lower end.

Figure 2:
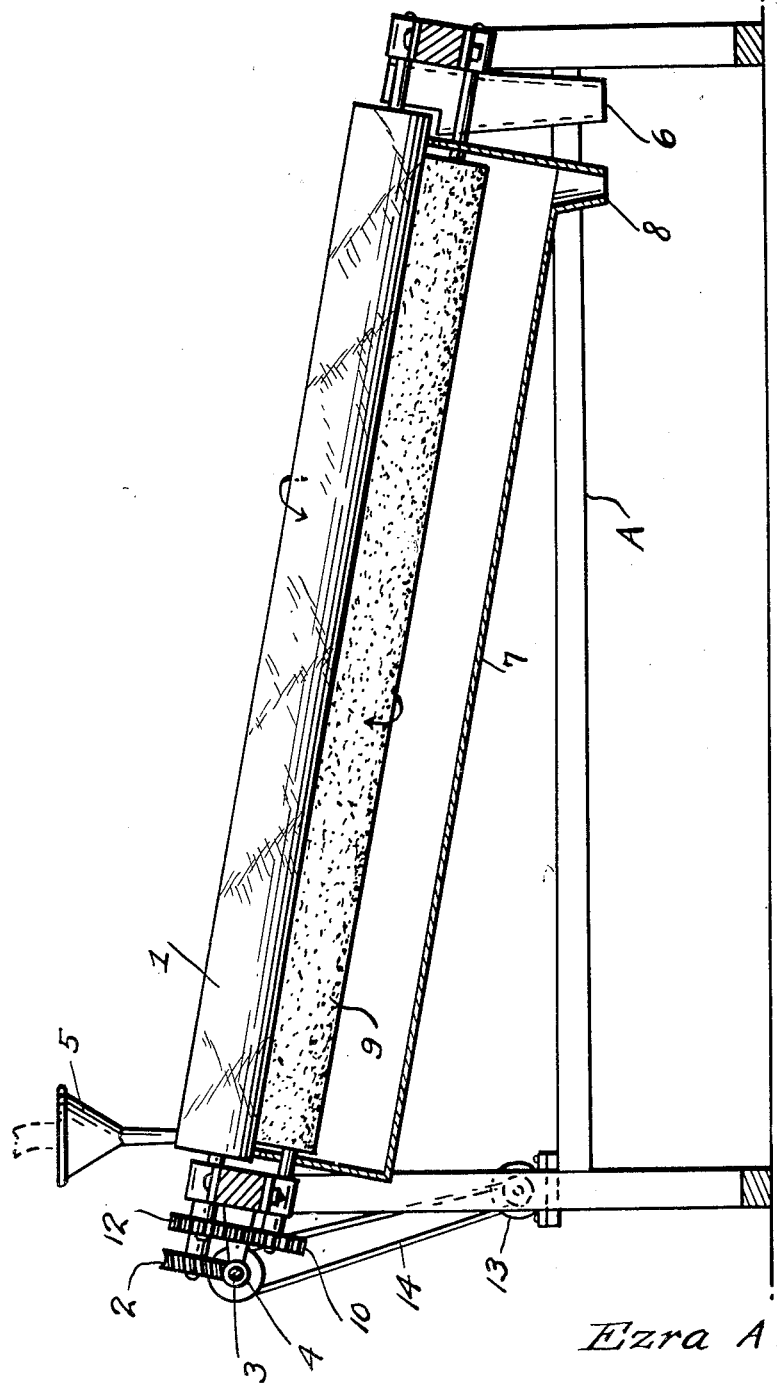
Fig. 2 is an elevation with parts in section.

A brush roller 9 is arranged under each roller 1 and is driven from said roller 1 by the gears 12 as shown in Fig. 2, it of course being understood that one of the gears 12 is carried by a trunnion of each roller 1 and the other gear by a trunnion of the brush roller.

A motor 13 is mounted on the frame and is connected to the shaft 3 by the belt and pulley shown generally at 14 for operating the shaft. As will be understood, the seeds are fed into the trough or space formed by each pair of rollers and will travel down said space or trough and the foreign matter and buckhorn or other foreign seeds will attached themselves to the cloth covering and thus be carried upwardly by the rotating rollers and those seeds that do not fall off of the rollers will travel downwardly with the rollers and will be brushed off by the brushing rollers and will collect in the pan. The clean seeds will drop into the chute 6.

The rollers can be placed at any desired inclination, and if desired suitable means can be provided for changing the tilt of the rollers for those seeds that have the least amount of other seeds or foreign matter mixed with them, can travel more quickly through the device than can seeds with heavy other seeds and foreign matter, and hence the tilting of the rollers for comparatively clean seeds can be greater.

By using the rubber rollers covered with canvas or the like, the wear of the roller is greatly reduced.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A seed cleaning device comprising a supporting frame having one end higher than the other end, a number of pairs of canvas covered rubber rollers having trunnions at their ends, the trunnion at one end of each roller being journalled in the high end of the frame, and the opposite trunnion in the lower end of the frame whereby said rollers are diagonally arranged, the rollers of each pair contacting each other and the pairs of rollers being spaced apart, one trunnion of a roller of each pair being extended, a worm gear on said extended part, a transverse shaft rotatably supported by the frame and having worms thereon engaging the worm gears, means for driving said shaft in a direction to rotate the rollers of each pair in opposite directions, means for feeding material into the space formed by the rollers of each pair and at the high end of said rollers, means for receiving the material passing from the lower ends of said rollers, a brush roller located under and paralleling each of the first-mentioned rollers, said brush roller having a trunnion at each end thereof journalled in the high and low end portions of the frame, gears connecting one trunnion of each brush roller to a trunnion of the first-mentioned roller above it, a pan supported by the frame, and the upper portion of which receives the brush rollers, the bottom of the pan paralleling the brush rollers and being spaced below the same, and a discharge spout at the low end of the pan.

EZRA A. GOOD.